UNITED STATES PATENT OFFICE.

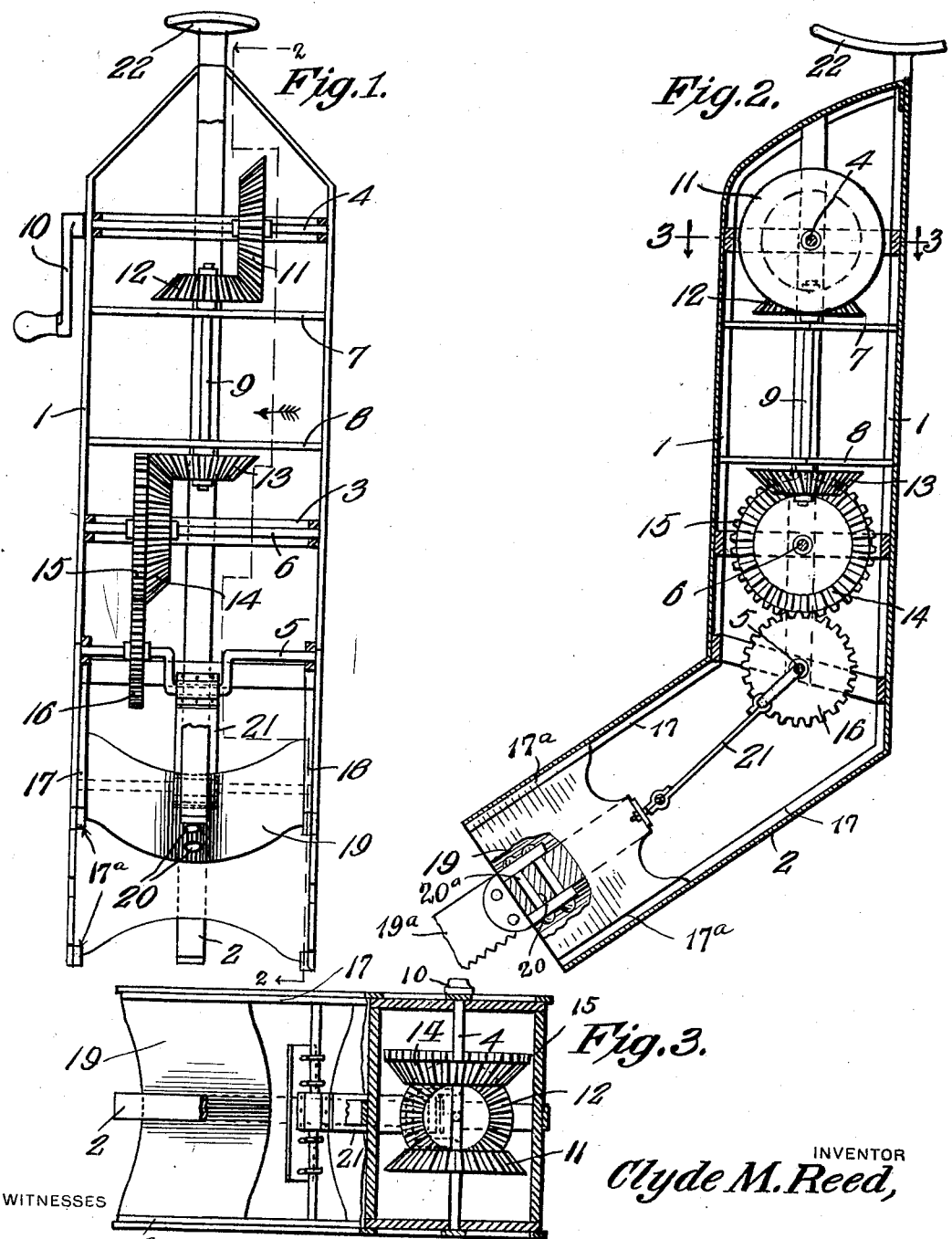

CLYDE M. REED, OF AKRON, OHIO.

COMPASS-SAW BRACE.

1,318,594.　　　　Specification of Letters Patent.　　Patented Oct. 14, 1919.

Application filed August 15, 1917. Serial No. 186,366.

*To all whom it may concern:*

Be it known that I, CLYDE M. REED, a citizen of the United States, residing at Akron, in the county of Summit and State of Ohio, have invented certain new and useful Improvements in Compass-Saw Braces, of which the following is a specification.

This invention relates to an improvement in compass saw braces, and it is a purpose of my invention to provide a structure which can be inexpensively manufactured as a portable tool, and which has the parts thereof so formed and arranged that a compass or key hole saw fitted to be operated by the mechanism can be used in relatively cramped quarters and in any desired position.

A further object lies in so constructing the parts that an operating crank is embodied with the structure and motion transmission mechanism is associated with parts operated by this crank so that as the crank is turned the desired reciprocatory movement will be imparted to the saw.

With the above and other objects in view, which will be in part described and in part understood from the specification, drawings, and claims, my invention consists in certain novel features of construction and combination of parts which will be hereinafter more fully set forth.

In the drawings:—

Figure 1 is a view in elevation of the structure and showing parts broken away to more clearly illustrate the mechanism;

Fig. 2 is a view taken at right angles to the disclosure of Fig. 1, and with parts shown in sections; and, Fig. 3 is a sectional view taken substantially on the line 3—3 of Fig. 2.

A supporting frame structure is made up of the strap metal members 1 which define a substantially rectangular frame structure, and these members are off set to provide the branch frame extension 2, cross frame members 3 being provided to connect the several elongated frame members 1 in the proper supporting relation. A power shaft 4 is mounted across the frame structure as set up, adjacent the upper end, whereas an operating crank shaft 5 is journaled in suitable bearings provided substantially adjacent the juncture of the branched portion 2 of the frame with the main body portion thereof, a transmission shaft 6 being mounted somewhat above this operating crank shaft 5. Cross-heads 7 and 8 are connected with- in the frame structure above the mounting of the shaft 6, and a power transmission shaft 9 is journaled in suitable bearings in these members 7 and 8.

An operating crank 10 is provided on the power shaft 4, and a beveled or miter gear 11 is keyed or otherwise secured upon this shaft to turn therewith, a beveled gear 12 being provided on the upper end of the shaft 9 to mesh with the gear 11. On the lower end of this power transmission shaft 9, a beveled gear 13 is secured, and a beveled gear 14 mounted on the shaft 6 meshes therewith. This gear 14 is also formed to provide a straight gear portion 15, and a gear 16 mounted on the operating crank shaft 5 meshes with the straight gear portion 15 of the beveled gear 14.

By connecting the parts in the manner as set forth, that is by meshing the gears as described, a direct drive from the power shaft 4 to the operating crank shaft 5 is accomplished, and as the crank 10 is turned the crank shaft will be revolved.

Members 17 and 18 are secured in conjunction with frame elements forming the branch 2 of the supporting frame, and a track way is thus formed, a block 19 having openings 20 therein for the reception of fastenings by which the saw blade is secured in place, being mounted reciprocably within the track or guide ways thus provided. Suitable grooves 17ª are formed in the block 19 for receiving the track members 17 and 18. A pitman rod 21 is connected with the crank of the crank shaft 5 and has pivotal connection with this block 19, and thus as the crank handle 10 is turned, the block 19 will be given reciprocatory movement, and when a saw is mounted in conjunction therewith and is brought to a position for operation, very efficient action of the saw will be secured.

A rest 22 is provided on the frame structure at the upper end, and if desired a casing might be fitted to the frame structure to inclose the operating parts. The saw blade 19ª might be fitted to be held in place by bolts or other suitable fastenings 20ª passed through the openings 20, or might be mounted and secured in any other desired way, and when it is to be used, the saw blade will be brought to the cutting position and with pressure exerted upon the rest 22, the operator will hold the frame structure in such a relation that as turning movement is given to the crank 10, and is transmitted through the train of gears as described, to turn the operating crank shaft 5, the block 19 will be given reciprocatory movement due to the fact that connection is established by the pitman 21 with the crank of the shaft 5, and in this way the saw blade will be reciprocated to accomplish the desired cutting action.

It should be understood that by having the branch frame extension projecting at an angle of approximately 45° as illustrated clearly in Fig. 2, the operator of the device may easily keep his eye upon the point where the saw blade 19ª is cutting into the material upon which he is working. It is essential in a device of this character that the operator be permitted to keep his eye upon the line of cutting drawn upon the work upon which he is operating, this being possible in the present mechanism, due to the fact that the saw blade 19ª is extended forwardly at an angle of approximately 45°.

While I have herein shown and described only one specific form and construction of the parts, it will be understood that changes and variations might be resorted to, in view of which fact I wish to be limited only to such points as may be set forth in the claims.

I claim:—

1. A compass saw brace comprising a frame provided with a substantially vertically extending portion terminating at its lower end in an angular extension projecting at substantially 45° to the longitudinal axis of the vertically extending portion of said frame, a train of gears mounted within said vertically extending portion of said frame, means for driving said train of gears, a crank shaft associated with said train of gears, a sliding block mounted within said angular extension, said sliding block provided with flat end portions resting snugly against the sides of said angular extension, a pitman connection between said sliding block and the crank shaft, guiding means within said angular extension, said sliding block provided with grooves for receiving said guiding means, and said sliding block provided with means for facilitating the attachment of a saw blade therewith.

2. A compass saw brace comprising a frame, said frame provided with a branch frame extension projecting at an angle of approximately 45° to the main frame, a sliding block mounted within said branch frame extension and adapted to reciprocate therein, an operating mechanism for actuating said sliding block mounted in said frame, a cutting medium carried by said sliding block for permitting the operator to easily follow and observe the operation of the cutting medium on the material upon which he is working, and a rest carried by said frame for facilitating the forcing of the cutting medium into engagement with the material upon which he is working.

3. A compass saw brace comprising a frame provided with a substantially vertically extending main body portion terminating at its lower end in a branch frame extension projecting at an angle of approximately 45° to the main body portion, a main operating gear, a train of gears coöperating with said main operating gear, a crank shaft driven through the medium of said chain of gears, a sliding guide block mounted within said branch extension, trackways for guiding said sliding block, said sliding block provided with grooves formed therein for receiving said trackways, said sliding block provided with dished upper and lower faces for receiving a cutting blade, said block provided with transversely extending apertures formed therein for receiving the cutting medium, and means formed upon said frame for facilitating the handling and operating thereof.

In testimony whereof I affix my signature in presence of two witnesses.

CLYDE M. REED.

Witnesses:
P. J. HAAS,
B. O'GORMAN.

Copies of this patent may be obtained for five cents each, by addressing the "Commissioner of Patents, Washington, D. C."